(12) United States Patent
Borsuk et al.

(10) Patent No.: US 10,410,819 B2
(45) Date of Patent: Sep. 10, 2019

(54) MICROWAVE POWERED LAMP WITH OPTIMIZED COOLING FOR DIFFERENT BULB CHEMISTRIES

(71) Applicant: NORDSON CORPORATION, Westlake, OH (US)

(72) Inventors: James M. Borsuk, Westlake, OH (US); James Khoury, Strongsville, OH (US); Edward C. McGhee, Powell, OH (US); James C. Smith, Amherst, OH (US)

(73) Assignee: Nordson Corporation, Westlake, OH (US)

( * ) Notice: Subject to any disclaimer, the term of this patent is extended or adjusted under 35 U.S.C. 154(b) by 107 days.

(21) Appl. No.: 15/303,010

(22) PCT Filed: Apr. 28, 2015

(86) PCT No.: PCT/US2015/027882
§ 371 (c)(1),
(2) Date: Oct. 9, 2016

(87) PCT Pub. No.: WO2015/168054
PCT Pub. Date: Nov. 5, 2015

(65) Prior Publication Data
US 2017/0047190 A1     Feb. 16, 2017

Related U.S. Application Data

(60) Provisional application No. 61/986,473, filed on Apr. 30, 2014.

(51) Int. Cl.
*H01J 7/24* (2006.01)
*H05B 41/28* (2006.01)
(Continued)

(52) U.S. Cl.
CPC .............. *H01J 7/24* (2013.01); *F21V 29/673* (2015.01); *H01J 61/125* (2013.01); *H01J 61/18* (2013.01);
(Continued)

(58) Field of Classification Search
USPC ...................................................... 250/504 R
See application file for complete search history.

(56) References Cited

U.S. PATENT DOCUMENTS 4,033,263 A * 7/1977 Richmond .......... B41F 23/0409
101/424.1
6,280,060 B1    8/2001 Suzuki et al.
(Continued)

FOREIGN PATENT DOCUMENTS

CN       101465265 A     6/2009
JP         3170758 U     9/2011

OTHER PUBLICATIONS

English Translation of CN Office Action dated Nov. 3, 2017 for CN Application No. 201580023166.
(Continued)

*Primary Examiner* — Kiet T Nguyen
(74) *Attorney, Agent, or Firm* — Baker & Hostetler LLP

(57) ABSTRACT

A system, method, and computer program product for optimizing the cooling of a UV bulb during a UV irradiation process is described. A power level in which to operate the UV bulb is received. In addition, a particular type of UV bulb being used in the UV irradiation process is received. Thereafter, at least one optimal UV cooling parameter that corresponds to the power level and the type of UV bulb is retrieved from a UV source parameters database. At least one control signal is then sent to a cooling device that is based on the retrieved optimal UV cooling parameter, and the control signal instructs the cooling device to cool the
(Continued)

particular type of UV bulb according to the retrieved optimal UV cooling parameter during the UV irradiation process.

16 Claims, 7 Drawing Sheets

(51) Int. Cl.
    *F21V 29/67*     (2015.01)
    *H05B 41/36*     (2006.01)
    *H01J 61/12*     (2006.01)
    *H01J 61/18*     (2006.01)
    *H01J 61/20*     (2006.01)
    *H01J 61/52*     (2006.01)
    *H01J 65/04*     (2006.01)

(52) U.S. Cl.
    CPC ............ *H01J 61/20* (2013.01); *H01J 61/523* (2013.01); *H01J 65/044* (2013.01); *H05B 41/2806* (2013.01); *H05B 41/36* (2013.01); *Y02B 20/22* (2013.01)

(56) References Cited

U.S. PATENT DOCUMENTS

| | | | |
|---|---|---|---|
| 6,847,170 B2 | 1/2005 | Kayser | |
| 7,952,289 B2 | 5/2011 | Bretmersky et al. | |
| 8,410,410 B2 | 4/2013 | Bretmersky et al. | |
| 2002/0047546 A1 | 4/2002 | Kayser | |
| 2003/0094904 A1* | 5/2003 | Wood | B29C 71/04 315/112 |
| 2012/0033708 A1* | 2/2012 | Howard | G01K 13/00 374/133 |
| 2012/0161021 A1* | 6/2012 | Smargiassi | G01N 21/33 250/372 |

OTHER PUBLICATIONS

English Translation of Jp Office Action Mailed on Feb 21, 2019 for Jp Application No. 2016565254.

* cited by examiner

MICROWAVE POWERED LAMP WITH OPTIMIZED COOLING FOR DIFFERENT BULB CHEMISTRIES

CROSS-REFERENCE TO RELATED APPLICATIONS

This application is a U.S. National Stage of International Patent App. No. PCT/US2015/027882, filed Apr. 28, 2015, which claims priority to U.S. Provisional App. No. U.S. 61/986,473, filed Apr. 30, 2014, the disclosures of which are incorporated by reference in their entirety.

TECHNICAL FIELD

This invention generally relates to the microwave powered lamps and, more particularly, to cooling of ultraviolet (hereinafter "UV") bulbs that are used in such lamps during a UV irradiation process.

BACKGROUND

Conventional microwave UV irradiation systems include a magnetron and UV bulb combination. Upon the application of power, the magnetron generates radio frequency (hereinafter "RF") energy to excite the gas of the UV bulb, which causes the UV bulb to emit UV energy. The emitted UV energy can be applied to various applications. For example, the UV energy can be applied to a substrate or product for curing materials thereon. In this way, materials, such as inks or adhesives for example, may be cured onto the various substrates or products by application of the UV energy produced by the UV bulb. As another example, the UV energy can be directed to a substrate or product to thereby modify the surface thereof.

Several different types of UV bulbs are known, each being designed with various chemicals to produce a greater amount of UV energy at select light frequencies. For example, a UV bulb with both Mercury and Iron will produce greater UV energy in the UVA wavelength range (320-390 nm), and a UV bulb with Mercury and Gallium will produce greater UV energy in the UVV wavelength range (390-460 nm). Furthermore, the power level in which a UV bulb is operated also affects the amount and spectral content of the UV energy radiated therefrom. In general, the most suitable type of UV bulb and the power level at which it should be operated depends on the application. Hence, to facilitate their usefulness, some microwave UV irradiation systems are able to operate several different types of UV bulbs at various power levels, such as the COOLWAVE 2 610, COOLWAVE 2 510, and COOLWAVE 2 410 developed by the Nordson Corporation.

It is also well known for microwave UV irradiation systems to include a cooling device, which is used to cool both the magnetrons and the UV bulb to keep them from exceeding acceptable operating temperatures. Conventional cooling systems use a fixed air pressure value and a pressure sensor to infer the flow of cooling air to the magnetrons and the UV bulb, regardless of the UV bulb type and power level being used. In other words, the cooling system adjusts the air flow based on a comparison between a pressure sensor reading and the fixed air pressure, and the fixed air pressure remains the same across all the various UV bulb types and power levels. However, depending on the UV bulb type and the power level being used, different degrees of cooling are necessary because some UV bulbs reach higher operating temperatures than others. For this reason, the fixed air pressure value and pressure sensor used to infer air flow in conventional systems is problematic. More particularly, as the temperature of a UV bulb decreases, the amount of UV energy that is radiated from the bulb tends to decrease, especially when the UV irradiation system is being operated at less than full power. In addition, if a UV bulb is over-cooled, the spectral content of the emitted UV energy may change, which is known as spectral shifting. Therefore, because the various UV bulb type and power level combinations require different degrees of cooling, as mentioned above, cooling based on achieving the fixed air pressure value as implemented in conventional systems may result in cooling some UV bulbs more than is necessary, thereby causing an unnecessary decrease of the amount of radiated UV energy or spectral shifting.

For these reasons, as well as others, it would be desirable to provide a system, method, and computer program product to improve blower cooling control and thereby optimize the amount of UV energy that is emitted by the various types of UV bulbs operating at various power levels, as well as prevent spectral shifting.

SUMMARY

In an embodiment of the invention, there is provided a system for cooling a particular type of UV bulb during a UV irradiation process. The system includes a cooling device, a processor, and a memory coupled to the processor. The memory stores instructions that, when executed by the processor, cause the system to receive a user selection of a power level in which to operate the system and a user indication of the particular type of UV bulb being used in the UV irradiation process. Furthermore, the instructions cause the system to retrieve, from a UV source parameters database, at least one optimized UV cooling parameter that corresponds to the user selection of the power level and the user indication of the particular type of UV bulb. Thereafter, the instructions further cause the system to send at least one control signal to the cooling device based on the retrieved optimized UV cooling parameter. The control signal is configured to instruct the cooling device to cool the particular type of UV bulb according to the retrieved optimized UV cooling parameter during the UV irradiation process.

In one embodiment, the UV irradiation cooling device, in response to receiving the control signal, may be configured to generate an air flow according to the retrieved optimized UV cooling parameter to cool the particular type of UV bulb. In addition, the cooling device, based on the retrieved optimized UV cooling parameter, may be configured to maintain the particular type of UV bulb at a constant temperature during the UV irradiation process. Preferably, the constant temperature is selected from a range comprising 800° C. to 850° C.

In another embodiment, the optimized UV cooling parameter may comprise at least one air pressure value. In addition, the system may include a pressure sensor coupled to the cooling device, and the cooling device may be configured to adjust the generated air flow if a measured air pressure value received from the pressure sensor varies from the at least one air pressure of the retrieved optimized UV cooling parameter by a threshold value.

In another embodiment, the optimal UV cooling parameter is based on historical and/or experimental tests.

In another embodiment of the invention, a method is provided for optimizing the cooling of a particular type of UV bulb during a UV irradiation process. The method includes receiving a user selection of a power level in which to operate the system and a user indication of the particular type of UV bulb being used in the UV irradiation process. Furthermore, the method includes retrieving, from a UV source parameters database, at least one optimized UV cooling parameter that corresponds to the user selection of the power level and the user indication of the particular type of UV bulb. Thereafter, the method further includes sending at least one control signal to the cooling device based on the retrieved optimized UV cooling parameter. The control signal is configured to instruct the cooling device to cool the particular type of UV bulb according to the retrieved optimized UV cooling parameter during the UV irradiation process.

In another embodiment of the invention, a computer product is provided that includes a non-transitory computer readable medium with program code stored thereon. The program code is configured, upon execution by a processor, to cause the processor to perform the steps of the above described method.

BRIEF DESCRIPTION OF THE DRAWINGS

The accompanying drawings, which are incorporated and constitute part of this specification, illustrate embodiments of the invention and, together with a general description of the invention given below, serve to explain the principles of the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

Figure 1:
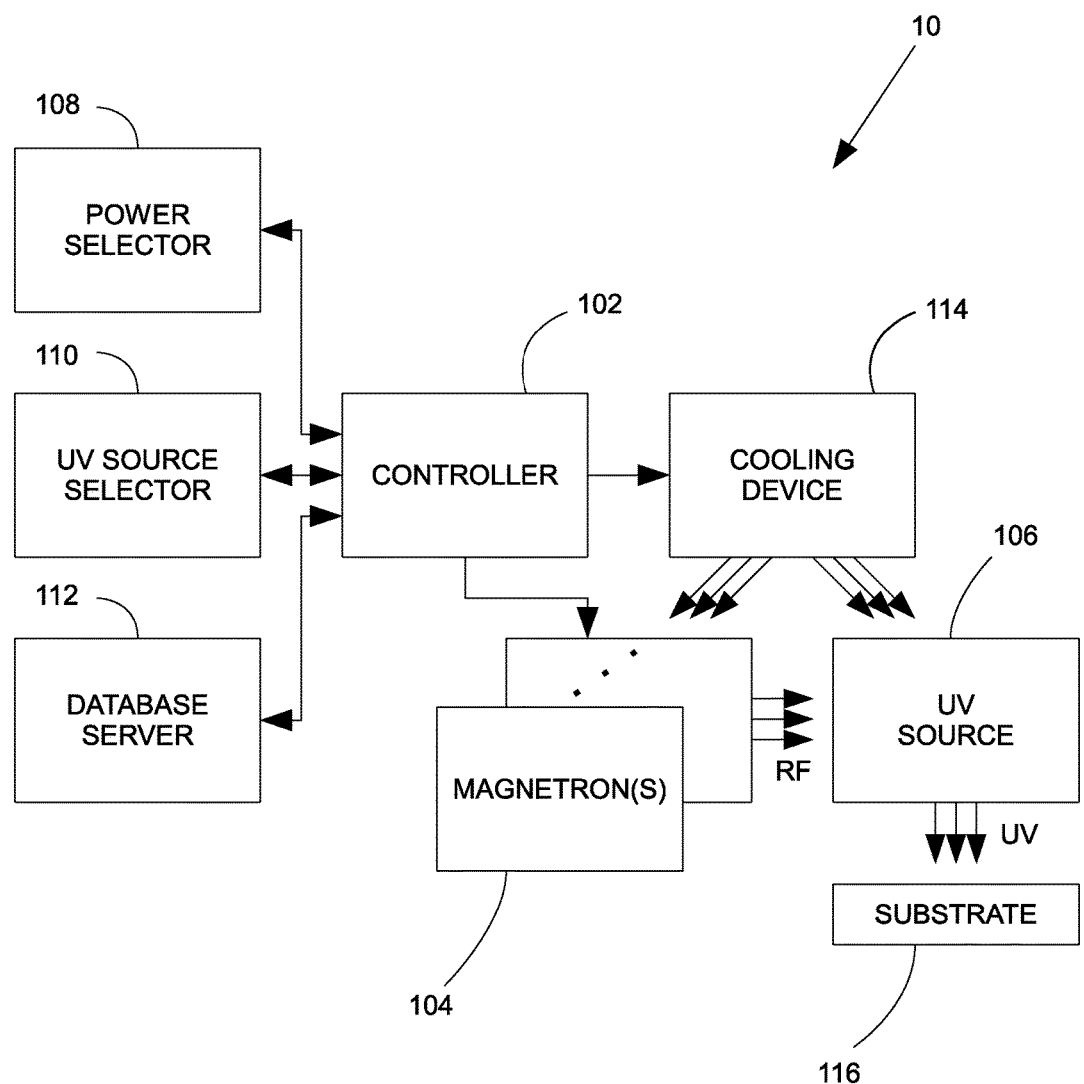
FIG. 1 is a schematic view of a system in accordance with one embodiment of the invention.

Turning to the Figures, wherein like numbers denote like parts through the several views, FIG. 1 provides a schematic diagram illustrating an operating environment or system 10 consistent with one or more embodiments of the invention. As shown in FIG. 1, system 10 includes a controller 102 coupled to one or more magnetrons 104. In response to receiving at least one control signal from the controller 102, the magnetrons 104 are configured to generate high RF fields. The high RF fields produced by the magnetrons 104 are received by a UV source 106, which in turn produces UV energy that is suitable for a plurality of applications. In one exemplary application, the UV energy is directed toward a product or substrate 116, thereby curing a material thereon. In another exemplary application, the UV energy can be directed to a product or substrate 116 and thereby modify a surface thereof. Those skilled in the art will recognize that there are several other suitable processes or applications in which UV energy is implemented via system 10.

In a preferred embodiment, UV source 106 is a UV bulb containing a chemical makeup that, when excited by the high RF fields, produces a high temperature plasma within the UV bulb. As the plasma is formed, the UV bulb produces radiated UV energy at various spectral frequencies. During operation, bulb temperatures may reach as high as 850° C. for maximum efficiency (i.e., maximum UV energy output with a desired spectral content). In addition to depending on temperature, the amount of radiated UV energy and the spectral content thereof depends on the particular type of UV bulb being used. Furthermore, the power level in which the UV bulb is being operating affects the amount of radiated UV energy and the spectral content thereof. In a preferred embodiment, the UV bulb includes Mercury. In addition to Mercury, suitable UV bulbs may also include Iron, Gallium, Indium, and/or Lead. As previously described, the amount of radiated UV energy and the spectral content thereof depends, in part, on the particular chemical makeup of the UV bulb being used. Consequently, each UV bulb type may be more or less suitable for a given UV process.

Controller 102 is also coupled to a power selector 108. The power selector 108 enables a user to select the power level in which the system 10 operates, which in turn affects the amount of RF energy generated by the magnetrons 104 and the amount of UV energy generated by the UV source 106. For example, a user may desire to run system 10 at 50% power to save energy and/or affect the amount of UV energy that is generated by the UV source 106 and the spectral content thereof. In this way, the user may further adapt the system 10 for different applications and environments.

Controller 102 is also coupled to a UV source selector 110, a database server 112, and a cooling device 114, the latter of which is used to cool the magnetrons 104 and UV source 106 to keep each from overheating. In general, the various types of UV sources 106, and more particularly the various types of UV bulbs, radiate maximum UV energy with a specific spectral content when the UV source 106 is maintained at a specific temperature. If a UV source 106 is cooled below this threshold, the amount of radiated UV energy can decrease and/or spectral shifting may occur. But each type of UV source 106 may, without cooling, reach different operating temperatures depending on the type of UV source 106 being used (e.g., the type of UV bulb) and the power level being applied. Therefore, depending on the power level being applied, the various types of UV sources 106 have different cooling parameters needed to maintain a constant operating temperature without decreasing past an efficient operating temperature threshold.

Accordingly, the UV source selector 110 enables a user to indicate the type of UV source 106 being used during a particular UV process. Upon receiving a user's indication of the UV source 106 being used, and upon receiving the user's power level selection indicated via the power selector 108, the controller 102 is configured to access and retrieve data from the database server 112. In general, the database server 112 stores data relating to the optimal cooling parameters for each particular UV source 106 and power level combination. Thus, the controller 102 retrieves the data corresponding to the user's indicated UV source 106 and selected power level combination from the database server 112. Based on the retrieved data, the controller 102 is configured to send at least one control signal to the cooling device 114, thereby instructing the cooling device 114 to cool the UV source 106 according to the data retrieved from the database server 112. In this way, the amount of radiated UV energy and the spectral content thereof is optimal for the user-input combination.

Figure 2:
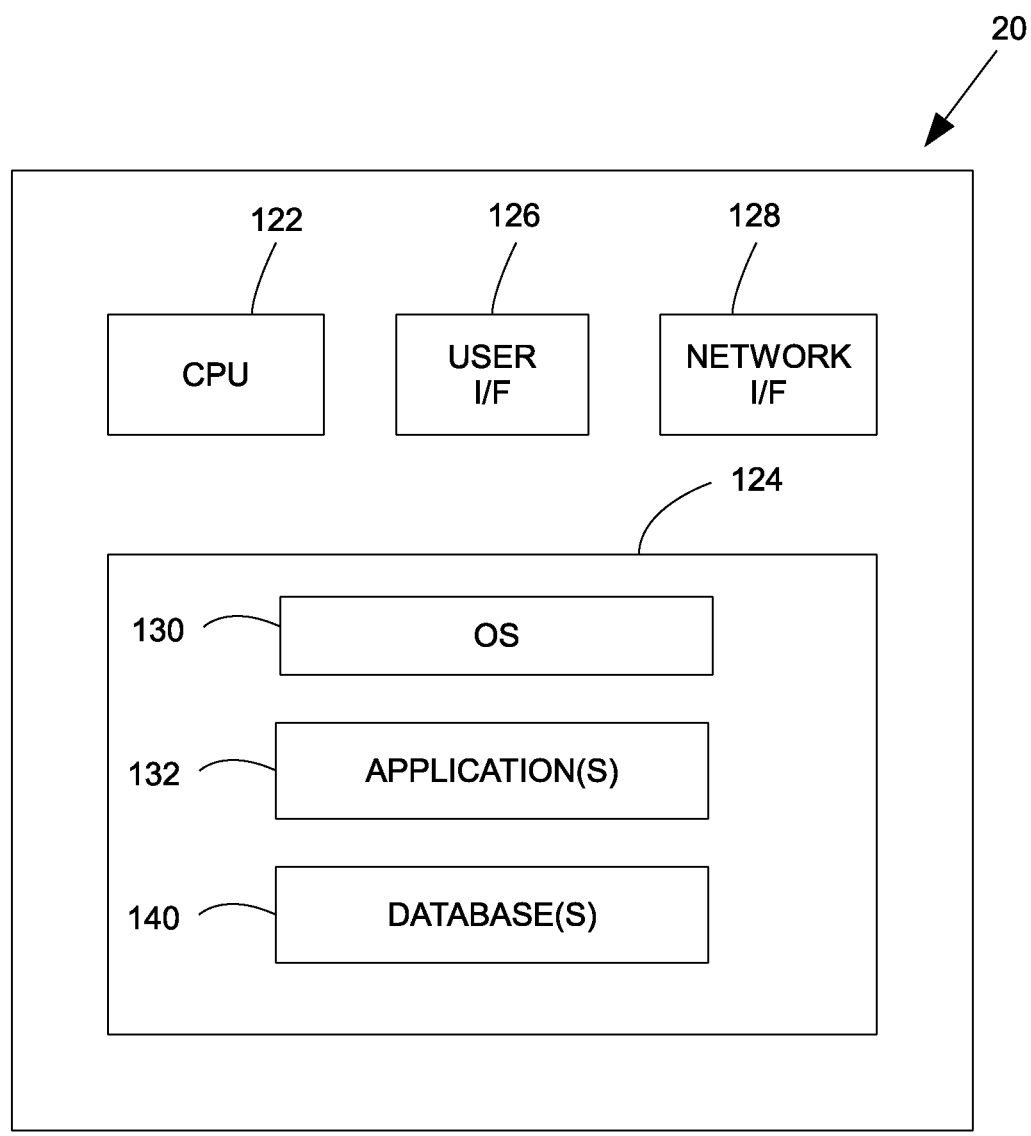
FIG. 2 is a schematic view of a computer device or system implemented in accordance with embodiments of the invention.

Referring now to FIG. 2, the controller 102 and database server 112 may be implemented on one or more computer devices or systems, such as exemplary computer system 20. The computer system 20 may include at least one processor 122 including at least one hardware-based microprocessor and a memory 124 coupled to the at least one processor 122. The processor 122 may include one or more devices selected from microprocessors, micro-controllers, digital signal processors, microcomputers, central processing units, field programmable gate arrays, programmable logic devices, state machines, logic circuits, analog circuits, digital circuits, and/or any other devices that manipulate signals (analog or digital) based on operational instructions that are stored in the memory 124. The memory 124 may represent a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, and/or any other device capable of storing information. In addition, memory 124 may be considered to include memory storage physically located elsewhere in computer system 20 (e.g., any cache memory in a microprocessor), as well as any storage capacity used as virtual memory. Furthermore, memory 124 may be considered to include memory storage located physically remote from and accessible by computer system 20, such as storage devices of other computer systems coupled to the computer system 20 and/or one or more mass storage devices, which may be, for example, external hard disk storage devices, external databases, storage area network devices, and/or any other mass storage device that would be recognized as suitable by those skilled in the art.

For interface with a user or operator, the computer system 20 may include a user interface 126 incorporating one or more user input/output devices. For example, the computer system 20 could incorporate a keyboard, a mouse or other pointing device, a display, a printer, a microphone, a speaker, a touch screen, various hardware components such as buttons, knobs, or sliders, and/or any other input/output device that those skilled in the art would recognize as suitable for communicating or interfacing with a user. In preferred embodiments, each of the power selector 108 and/or the UV source selector 110, which are coupled to the controller 102, comprises one or more of these input/output devices. Data may be communicated by computer system 20 to and/or from another device, computer, or terminal over a suitable network interface 128 that is coupled to a communication network.

The computer system 20 typically operates under the control of an operating system 130 and executes or otherwise relies upon various computer software applications, sequence of operations, components, programs, files, objects, modules engines, or any like applications, such as application 132. In specific embodiments, computer system 20 may execute or otherwise rely on a control application 302 (FIG. 3), which is discussed in more detail below. In an alternative embodiment, the processor 122 executes application 132 directly, in which case the operating system 130 may be omitted.

In one embodiment, the application 132 is stored on memory 124 during manufacture of the computer system 20. In an alternative embodiment, application 132 may be implemented as one or more downloadable applications, such as an application supported by Android and iOS operating systems available from Open Handset Alliance and Apple computer, respectively, or in other forms of program code as appropriate for a particular computer device or system. In other embodiments, application 132 may be downloaded from an external source including, for example, a network accessible location (e.g., a mobile application store, an accessible database, etc.), a computer readable storage media, and/or other such external sources.

The memory 124 of computer system 20 may generally store one or more databases 140 including, for example, a UV source parameters database 304 that stores one or more optimized UV cooling parameters 306 (FIG. 3), discussed in more detail below.

The one or more databases 140 may comprise data and supporting data structures that store and organize the data used by the system 20. In particular, the databases 140 may be arranged with any database organization and/or structure including, but not limited to, a relational database, a hierarchical database, a network database, and/or combinations thereof. A database management system in the form of a computer software application executing as instructions on a processing unit of the computer system 20 may be used to access the information or data stored in the databases 140 in response to a query, where a query may be dynamically determined and executed by the operating system 130 and/or other applications 132.

Figure 3:
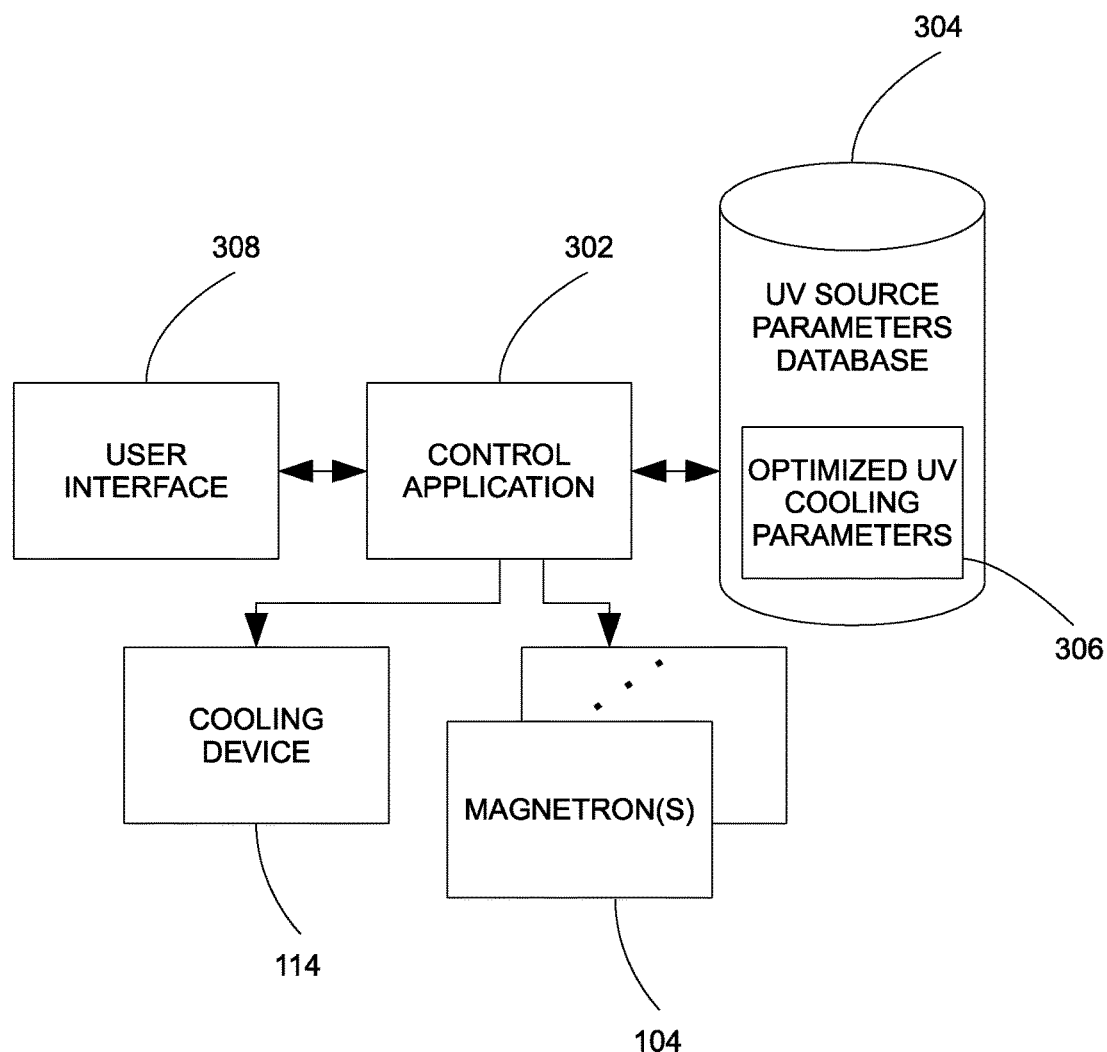
FIG. 3 is a schematic view of an application and database implemented in accordance with embodiments of the invention.

Referring to FIG. 3, an exemplary application 132 and database 140 consistent with embodiments of the invention will now be described. To begin, control application 302 is operatively coupled to the magnetrons 104 and cooling device 114, and is able to send at least one control signal to direct the operation of both. Control application 302 is also coupled to UV source parameters database 304, which is configured to store one or more optimized UV cooling parameters 306, discussed in more detail below. In a preferred embodiment, the UV source parameters database 304 is hosted on the database server 112.

In a preferred embodiment, the control application 302 is hosted by the controller 102. Moreover, the control application 302, upon being executed by a processor 122, is configured to perform the above described functions of the controller 102. Accordingly, the control application 302 may be configured to facilitate receiving a user's selection of a power level, instruct the magnetrons 104 to generate high RF fields according to the user's power level selection, and thereby cause the UV source 106 to produce UV energy. Furthermore, the control application 302 may be configured to facilitate receiving a user's indication of the particular UV source 106 being used, retrieve at least one optimized UV cooling parameter 306 from the UV source parameters database 304 based on the user's UV source indication and power level selection, and instruct the cooling device 114 to operate according to the retrieved optimized UV cooling parameter 306.

In one embodiment, control application 302 is also configured to generate a user interface 308, which enables a user to input information, such as by the user interface 126 of computer system 20, into the controller 102 and/or control application 302. Hence, the user interface 308 may facilitate receiving a user's indication of the UV source 106 being used and/or a user's selection of a power level in which to operate. Typically, the user interface 308 is accessible by input/output devices coupled with the controller 102 and/or control application 302, such as by the power selector 108 and/or the UV source selector 110. However, in some embodiments, user interface 308 may be a web-based user interface, and the user may access the web-based user interface with an Internet web browser. In other embodiments, the user interface 308 may be a dedicated interface, such as an interface that may be provided by a special purpose application configured to be executed on a computer device and receive interface data from the control application 302.

In a preferred embodiment, the UV source parameters database 304 is hosted on the database server 112. The UV source parameters database 304 includes optimized UV cooling parameters 306, organized by UV source type and/or power level. Thus, based on the user's entered UV source 106 and power level combination, the control application 302 and/or controller 102 may retrieve at least one corresponding optimized UV cooling parameter 306 from the UV source parameters database 304. Thereafter, based on the retrieved optimized UV cooling parameter 306, the control application 302 and/or controller 102 may send at least one control signal to the cooling device 114, thereby instructing the cooling device 114 to operate such that the optimal amount of UV energy for the particular UV source 106 and power level combination having a specific spectral content is generated.

More particularly, the various types of UV sources 106, such as the UV bulbs described above, radiate optimal UV energy having a specific spectral content when the UV source 106 is maintained at a certain constant temperature. If the temperature of the UV source 106 is decreased below this threshold, the amount of radiated UV energy may decrease and spectral shifting may occur. In preferred embodiments, this threshold temperature is within the inclusive range of 800° C. to 850° C. However, depending on the UV source 106 being used and the power level being applied, the various types of UV sources 106 are capable of reaching different operating temperatures, and so each UV source 106 has different cooling needs.

Thus, the optimized UV cooling parameters 306, which are organized by UV source 106 and power level within the UV source parameters database 304, are configured to enable the control application 302 and/or controller 102 to, via at least one control signal sent to the cooling device 114, maintain the UV source 106 at an efficient operating temperature for the particular UV source 106 and/or power level combination in use. In a preferred embodiment, a lamphead contains both the magnetrons 104 and the UV source 106, and the cooling device 114 includes either internal and/or external lamphead blowers, which produce a cooling air flow to cool the magnetrons 104 and the UV source 106.

The optimized UV cooling parameters 306 will now be described in more detail. In some embodiments, the optimized UV cooling parameters 306 contain data indicating the amount of air pressure that should be maintained by the air flow produced by cooling device 114 for a particular UV source 106 and power level combination. For example, when a UV bulb having iron and mercury is being operating at full power, the corresponding optimized UV cooling parameter 306 may indicate that the cooling device 114 maintain an air flow that relates to a pressure of 7 inWC to achieve optimal radiated UV energy with a specific spectral content. Conversely, when the same UV bulb having iron and mercury is operated at 50% power, the optimized UV cooling parameters 306 may indicate that the cooling device 114 maintain an air flow that relates to an air pressure of 2 inWC. In this way, the optimized UV cooling parameters 306 guide the cooling of a UV source 106 being operated at a given power level, such that the UV source 106 is maintained at a constant temperature that maximizes the efficiency of the UV source 106. In some embodiments, the cooling device 114 is coupled to a pressure sensor, which measures the current pressure of the air flow produced by the cooling device 114. The pressure readings are received by cooling device 114, which adjusts the air flow based on a comparison between the pressure readings and air pressure indicated by the optimized UV cooling parameter 306. For example, if a current pressure reading varies from the air pressure indicated by the optimized UV cooling parameter 306 by a predetermined threshold, the cooling device 114 may adjust the air flow so as to bring the pressure comparison within the threshold.

Alternatively or in combination with air pressure, the optimized UV cooling parameters 306 may also contain data indicating other values relating to cooling each UV source 106 and/or power level combination. For example, the optimized UV cooling parameters 306 could include data relating to a blower, motor, and/or RPM speed in which to operate the cooling device 114. In these embodiments and the like, a pressure sensor could still be coupled to the cooling device 114. But, instead of being used to facilitate adjusting air flow on the basis of pressure, the pressure sensor could be used as a safety or pressure confirmation device.

Those skilled in the art will recognize that there are several kinds of suitable optimized UV cooling parameters 306 relating to the operation of cooling device 114 that could be implemented to efficiently cool UV source 106 besides the examples listed above. In a preferred embodiment, the optimized UV cooling parameters 306 are based on historical or experimental data recorded from previous testing of the various types of UV sources 106 at various power levels.

Although exemplary computer devices have been referred to for hosting the above-described control application 302 and UV source parameters database 304, it will be recognized by those skilled in the art that these items may be hosted on any device or devices similar to computer system 20 and/or is capable of executing them. For example, in some embodiments, the control application 302 is hosted on the same computer device or devices as the UV source parameters database 304. Given the typically endless number of manners in which applications 132 and the UV source parameters database 304 may be organized on computer devices, it should be appreciated that the invention is not limited to any specific organization and allocation of program functionality described herein.

Figure 4:
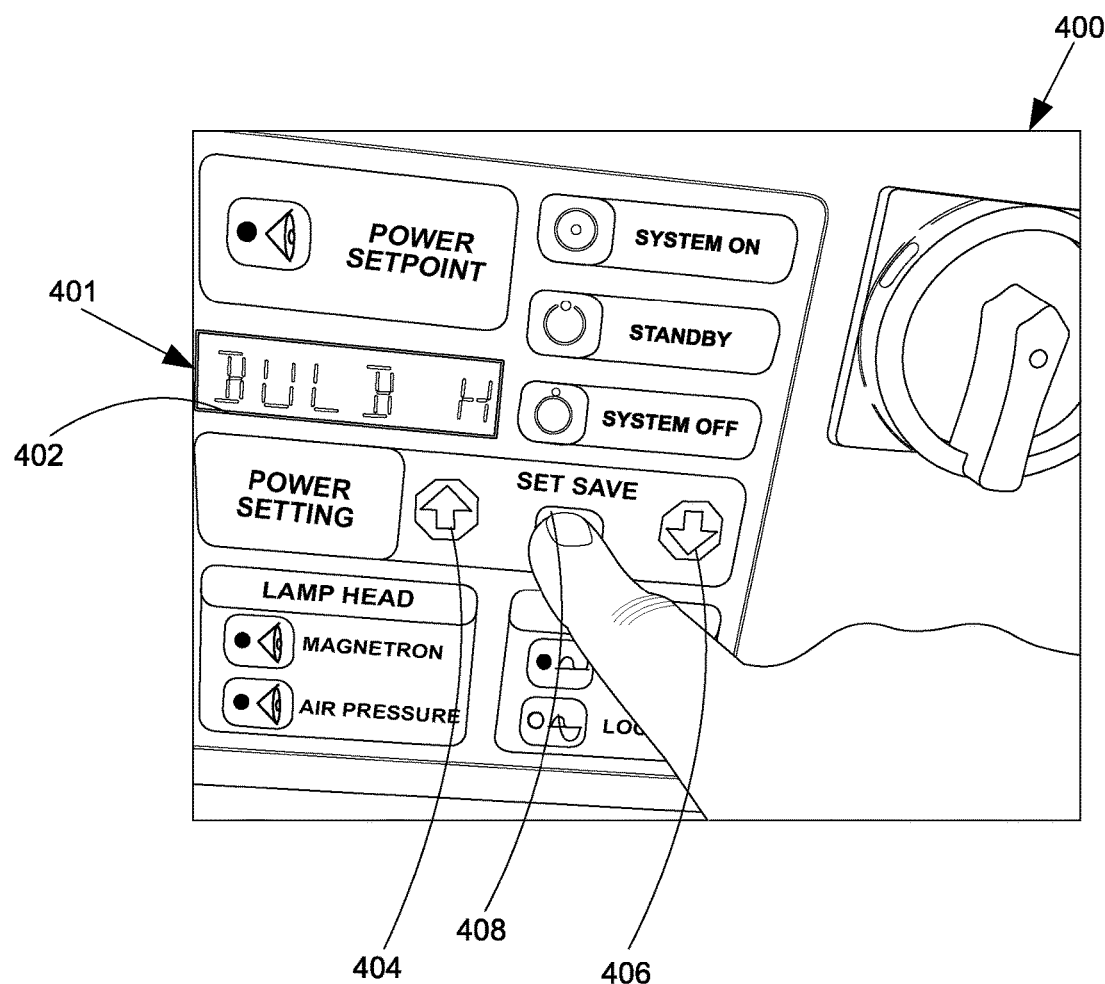
FIG. 4 is a view of an exemplary interface panel implemented in an embodiment of the invention.

FIG. 4 illustrates an exemplary control panel 400 that may be coupled to the control application 302 and/or controller 102. Control panel 400 illustrates an exemplary user interface 401 that may be generated by control application 302, which is shown to a user via display element 402. Exemplary user interface 401 is configured to display a user's current UV source indication and/or power level selection. In addition, control panel 400 illustrates elements 404, 406, and 408 to respectively scroll up, scroll down, and set a UV source 106 or power level. Hence, in some embodiments, the display element 402, and elements 404, 406, and 408 of control panel 400 may form parts of the power selector 108 and/or UV source selector 110. For example, FIG. 4 illustrates that a UV source 106 entitled "BULB H" is being indicated by the user.

Figure 5:
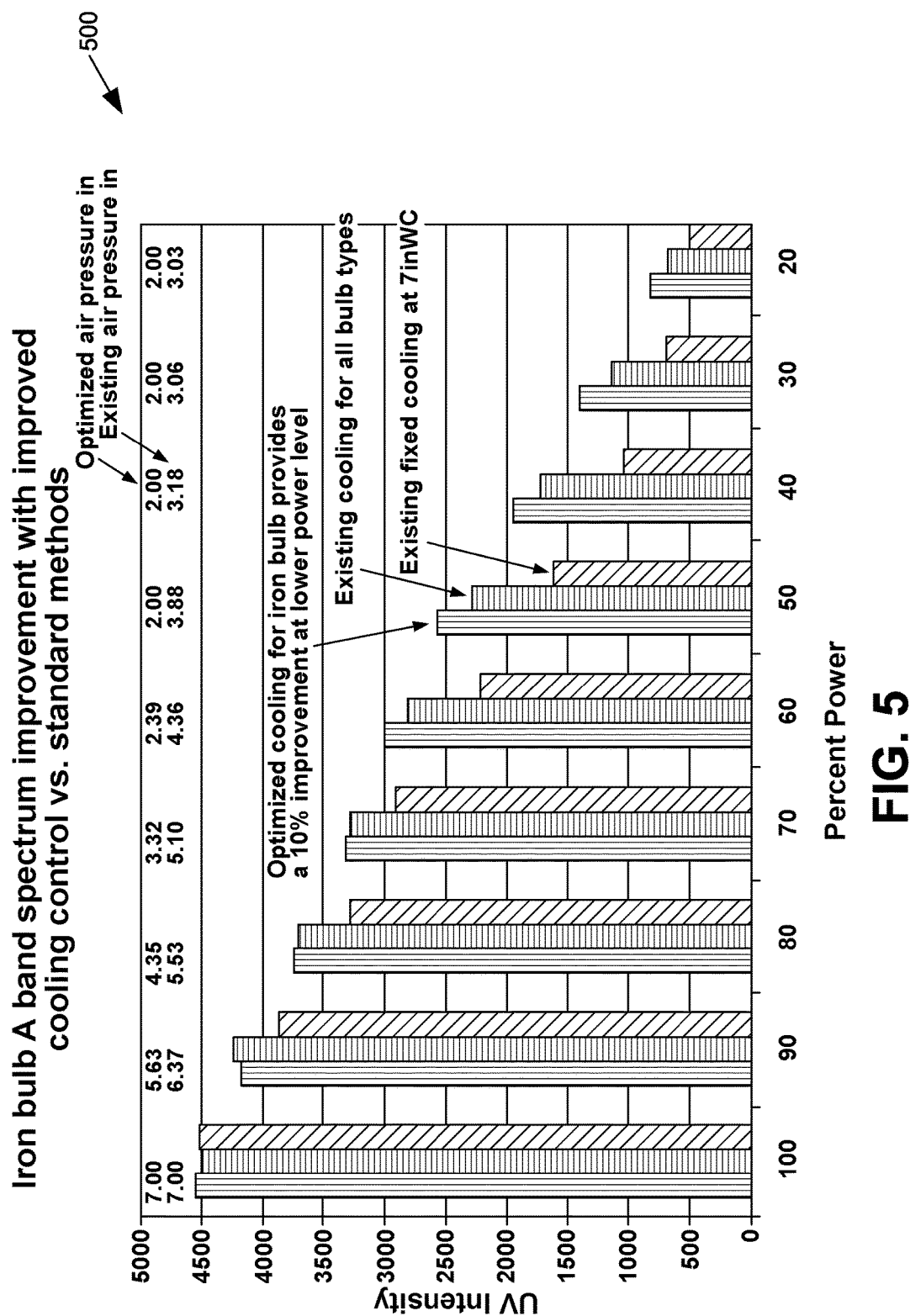
FIG. 5 is a chart illustrating UV energy intensity for a UV bulb as a function of percent power under conventional UV systems and under an exemplary embodiment of the present invention.

FIG. 5 is a chart 500 illustrating a comparison between the fixed air pressures used in conventional UV systems and optimized air pressures embodied in exemplary optimized UV cooling parameters 306 for a UV bulb having Mercury and Iron operating at various power levels. As is shown in chart 500, when the UV bulb is being operating at 70%, for example, more UV energy is radiated when an optimized air pressure of 3.32 inWC is used. Conversely, less UV energy is radiated when a fixed air pressure, which is the same across all the types of UV sources 106, of 7 inWC is used. Hence, in this example, at a 70% operating power level, using an optimized air pressure specific to a UV bulb having Mercury and Iron is more efficient than using the fixed air pressure used in conventional systems.

Figure 6:
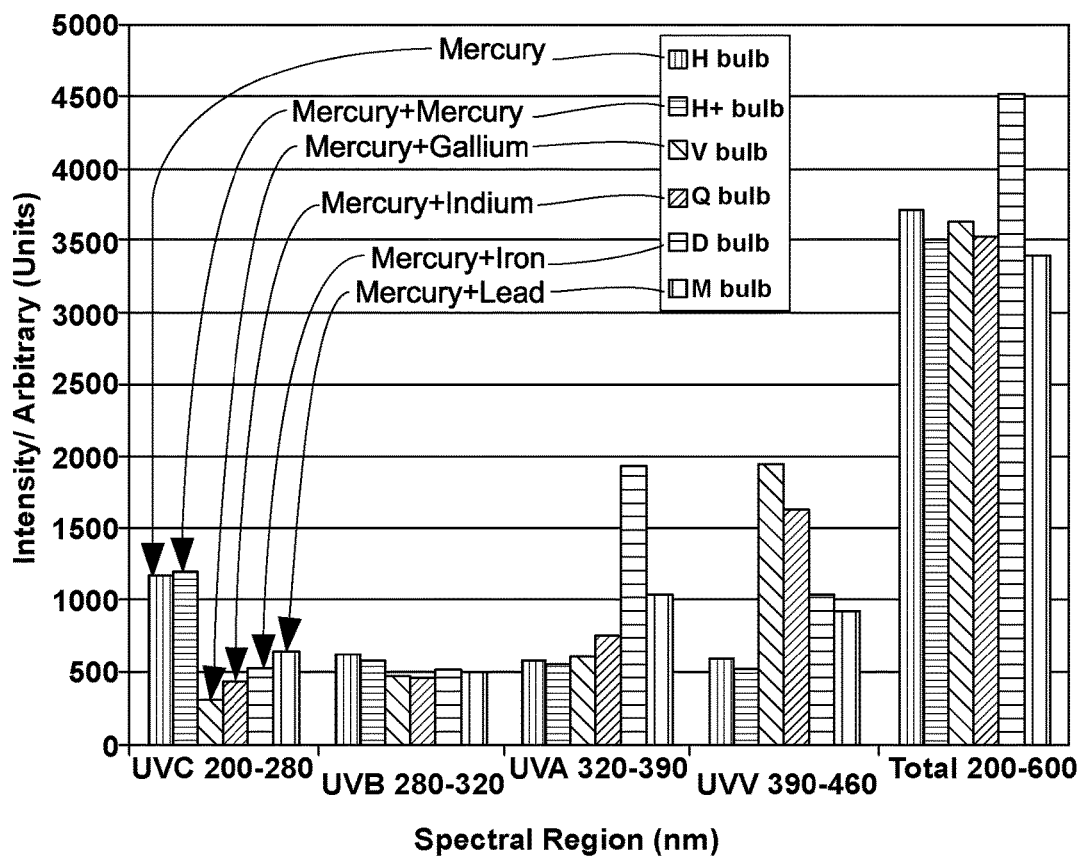
FIG. 6 is a chart illustrating the UV intensity of different UV bulb types at the various UV spectral regions.

FIG. 6 is a chart 600 showing the spectral output and intensity of UV energy radiated from various types of UV sources 106 having different chemistries. For example, chart 600 illustrates that a UV bulb containing only Mercury gas will produce less UV energy in the UVA range than a UV bulb having both Mercury and Iron.

Figure 7:
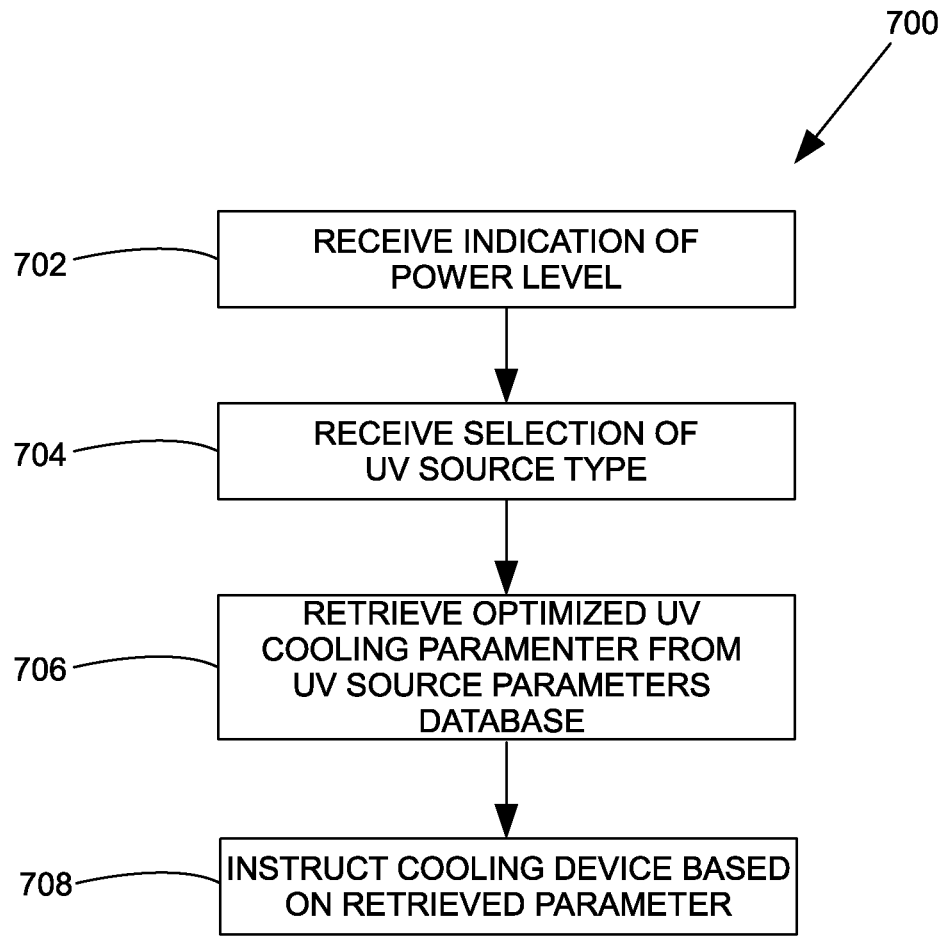
FIG. 7 is a flowchart illustrating features of an embodiment of the invention.

FIG. 7 illustrates a sequence of steps 700 consistent with embodiments of the invention that may be carried out by the control application 302 and/or the controller 102. To begin, the control application 302 and/or controller 102 receives a user's power level selection, such as through power selector 108 (box 702). Thereafter, the control application 302 and/or controller 102 receive a user's indication of the particular type of UV source 106 being used, such as through UV source selector 110 (box 704). In alternative embodiments, the order in which these user-input criteria are received is in reverse or simultaneous. Once both the user's UV source indication and power level selection are received, the control application 302 and/or controller 102 is configured to retrieve at least one optimized UV cooling parameter 306 from UV source parameters database 304 corresponding to the user's entered UV source 106 and power level combination (box 706). Subsequently, the control application 302 sends at least one control signal to the cooling device 114, thereby instructing the cooling device 114 to cool the UV source 106 according to the retrieved optimized UV cooling parameter 306 (box 708).

The program code embodying any of the embodiments of the invention described herein is capable of being individually or collectively distributed as a program product in a variety of different forms. In particular, the program code may be distributed using a computer readable media, which may include computer readable storage media and communication media. Computer readable storage media, which are inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Communication media may embody computer readable instructions, data structures, or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

The methods described herein can be implemented by computer program instructions supplied to the processor of any type of computer to produce a machine with a processor that executes the instructions to implement the functions/acts specified herein. These computer program instructions may also be stored in a non-transitory computer readable medium that can direct a computer to function in a particular manner. To that end, the computer program instructions may be loaded onto a computer to cause the performance of a series of operational steps and thereby produce a computer implemented process such that the executed instructions provide processes for implementing the functions/acts specified herein.

In addition, program code described herein may be identified based upon the application or software component within which the program code is implemented in a specific embodiment of the invention. However, it should be appreciated that any particular program nomenclature used herein is used merely for convenience, and thus the invention should not be limited to use solely in any specific application identified and/or implied by such nomenclature. It should be further appreciated that the various features, applications, and devices disclosed herein may also be used alone or in any combination. Moreover, given the typically endless number of manners in which computer programs may be organized into routines, procedures, methods, modules, objects, and the like, as well as the various manners in which program functionality may be allocated among various software layers that are resident within a typical computing system (e.g., operating systems, libraries, APIs, applications, applets, etc.), and/or across one or more hardware platforms, it should be appreciated that the invention is not limited to the specific organization and allocation of program functionality described herein.

While embodiments of the invention have been illustrated by a description of various examples, and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative methods, and illustrative examples shown and described. Accordingly, departures may be made from such details without departing from the spirit or scope of applicant's general inventive concept.

What is claimed is:

1. A system for optimizing cooling of a particular type of UV bulb during a UV irradiation process, the system comprising:
   a power level selector configured to enable a user to select a power level, from a plurality of power levels, in which to operate the system;
   a UV source selector configured to enable the user to indicate a type of UV bulb, from a plurality of types of UV bulbs, used during the UV irradiation process;
   a UV source parameters database that stores a plurality of optimized UV cooling parameters, the plurality of optimized UV cooling parameters each respectively corresponding to combinations of the plurality of power levels and the plurality of types of UV bulbs;

a cooling device;
a processor; and
a memory coupled to the processor, the memory storing instructions that, when executed by the processor, cause the system to:
receive, through the power level selector, the power level, from the plurality of power levels, in which to operate the system;
receive, through the UV source selector, the type of UV bulb from the plurality of types of UV bulbs being used in the UV irradiation process;
retrieve, from the UV source parameters database, at least one optimized UV cooling parameter, from the plurality of optimized UV cooling parameters stored in the UV source parameters database, the at least one optimized UV cooling parameter corresponding to the power level received through the power level selector and the type of UV bulb received through the UV source selector; and
forward at least one control signal to the cooling device based on the retrieved at least one optimized UV cooling parameter, wherein the at least one control signal is configured to instruct the cooling device to cool the type of UV bulb according to the retrieved at least one optimized UV cooling parameter during the UV irradiation process.

2. The system of claim 1, wherein the cooling device, in response to receiving the at least one control signal, is configured to generate an air flow according to the retrieved at least one optimized UV cooling parameter to cool the type of UV bulb.

3. The system of claim 2, wherein the cooling device, based on the retrieved at least one optimized UV cooling parameter, is configured to maintain the type of UV bulb at a constant temperature during the UV irradiation process.

4. The system of claim 3, wherein the constant temperature is selected from a range comprising 800° C. to 850° C.

5. The system of claim 2, wherein the retrieved at least one optimized UV cooling parameter comprises at least one air pressure value.

6. The system of claim 5, further comprising:
a pressure sensor coupled to the cooling device, wherein the cooling device is configured to adjust the generated air flow if a measured air pressure value received from the pressure sensor varies from the air pressure value of the retrieved at least one optimized UV cooling parameter by a threshold value.

7. The system of claim 1, wherein the retrieved at least one optimal UV cooling parameter is based on historical data or experimental tests.

8. A method for optimizing cooling of a particular type of UV bulb during a UV irradiation process, the method comprising:
selecting a power level, from a plurality of power levels, in which to operate the system;
indicating a type of UV bulb, from a plurality of types of UV bulbs, used during the UV irradiation process;
storing, in a UV source parameters database, a plurality of optimized UV cooling parameters, the plurality of optimized UV cooling parameters each respectively corresponding to combinations of the plurality of power levels and the plurality of types of UV bulbs;
receiving the selected power level in which to operate the indicated type of UV bulb during the UV irradiation process;
receiving the indicated type of UV bulb being used in the UV irradiation process;
retrieving at least one optimized UV cooling parameter, from the plurality of optimized UV cooling parameters stored in the UV source parameters database, the at least one optimized UV cooling parameter corresponding to the selected power level and the indicated type of UV bulb; and
forwarding at least one control signal to a cooling device based on the retrieved optimized UV cooling parameter, wherein the at least one control signal is configured to instruct the cooling device to cool the indicated type of UV bulb according to the retrieved at least one optimized UV cooling parameter during the UV irradiation process.

9. The method of claim 8, further comprising generating, in response to reception of the at least one control signal by the cooling device, an air flow according to the retrieved at least one optimized UV cooling parameter to cool the UV bulb.

10. The method of claim 8, further comprising maintaining, in response to reception of the control signal by the cooling device, the UV bulb at a constant temperature during the UV irradiation process.

11. The method of claim 10, wherein the constant temperature is selected from a range comprising 800° C. to 850° C.

12. A non-transitory computer readable medium storing program code configured, upon execution by a processor, to cause the processor to:
receive a power level, from a plurality of power levels, in which to operate a type of UV bulb during a UV irradiation process;
receive the type of UV bulb, from a plurality of types of UV bulbs, being used in the UV irradiation process;
retrieve at least one optimized UV cooling parameter corresponding to the received power level and the received type of UV bulb, the at least one optimized UV cooling parameter being one of a plurality of optimized UV cooling parameters stored in the UV source parameters database, and the plurality of optimized UV cooling parameters each respectively corresponding to combinations of the plurality of power levels and the plurality of types of UV bulbs; and
forward at least one control signal to a cooling device based on the retrieved at least one optimized UV cooling parameter, wherein the at least one control signal is configured to instruct the cooling device to cool the UV bulb according to the retrieved at least one optimized UV cooling parameter during the UV irradiation process.

13. A system for optimizing cooling of a particular type of UV bulb during a UV irradiation process, the system comprising:
a cooling device;
a processor; and
a memory coupled to the processor, the memory storing instructions that, when executed by the processor, cause the system to:
receive a power level in which to operate the system;
receive a type of UV bulb being used in the UV irradiation process;
retrieve, from a UV source parameters database, at least one optimized UV cooling parameter corresponding to the power level and the type of UV bulb; and
forward at least one control signal to the cooling device based on the retrieved at least one optimized UV cooling parameter, wherein the at least one control signal is configured to instruct the cooling device to cool the UV bulb according to the retrieved at least one optimized UV cooling parameter during the UV irradiation process, wherein the cooling device, in response to receiving the at least one control signal, is configured to generate an air flow according to the retrieved at least one optimized UV cooling parameter to cool the UV bulb, and the retrieved at least one optimized UV cooling parameter comprises at least one air pressure value.

14. The system of claim 13, wherein the cooling device, based on the retrieved at least one optimized UV cooling parameter, is configured to maintain the UV bulb at a constant temperature during the UV irradiation process.

15. The system of claim 14, wherein the constant temperature is selected from a range comprising 800° C. to 850° C.

16. The system of claim 13, wherein the retrieved at least one optimal UV cooling parameter is based on historical data or experimental tests.

* * * * *